(12) United States Patent
Stratton et al.

(10) Patent No.: US 10,786,875 B2
(45) Date of Patent: Sep. 29, 2020

(54) ABRASIVE PREFORMS AND MANUFACTURE AND USE METHODS

(71) Applicant: United Technologies Corporation, Farmington, CT (US)

(72) Inventors: Eric W. Stratton, Mansfield, TX (US); Michael J. Minor, Mansfield, TX (US)

(73) Assignee: Raytheon Technologies Corporation, Farmington, CT (US)

( * ) Notice: Subject to any disclaimer, the term of this patent is extended or adjusted under 35 U.S.C. 154(b) by 76 days.

(21) Appl. No.: 16/027,175

(22) Filed: Jul. 3, 2018

(65) Prior Publication Data

US 2018/0311772 A1 Nov. 1, 2018

Related U.S. Application Data

(63) Continuation-in-part of application No. 14/755,350, filed on Jun. 30, 2015, now Pat. No. 10,030,527, and
(Continued)

(51) Int. Cl.
*B23K 35/00* (2006.01)
*B23K 35/02* (2006.01)
(Continued)

(52) U.S. Cl.
CPC ........ *B23K 35/0238* (2013.01); *B23K 1/0018* (2013.01); *B23K 26/38* (2013.01); *B23K 35/304* (2013.01); *F01D 11/122* (2013.01); *B23K 2101/001* (2018.08); *B23K 2101/18* (2018.08); *B23K 2103/166* (2018.08); *B24D 3/06* (2013.01); *B24D 18/0054* (2013.01);
(Continued)

(58) Field of Classification Search
CPC .. B23K 35/0238; B23K 26/38; B23K 1/0018; B23K 35/304; B23K 2103/166; B23K 2101/18; B23K 2101/001; F01D 11/122; F05D 2300/2282; F05D 2300/611; F05D 2300/175; F05D 2230/237; F05D 2230/90; F05D 2300/6032; B24D 18/0054; B24D 3/06
USPC ....................................... 228/245–262, 56.3
See application file for complete search history.

(56) References Cited

U.S. PATENT DOCUMENTS 3,615,309 A 10/1971 Dawson
3,751,283 A 8/1973 Dawson
(Continued)

FOREIGN PATENT DOCUMENTS

CA 2613965 A1 1/2007
DE 4439950 A1 5/1996
(Continued)

OTHER PUBLICATIONS

European Search Report dated Jan. 7, 2016 for EP Patent Application No. 15175022.1.
(Continued)

*Primary Examiner* — Kiley S Stoner
(74) *Attorney, Agent, or Firm* — Bachman & LaPointe, P.C.

(57) ABSTRACT

A method for applying an abrasive comprises: applying, to a substrate, the integral combination of: a self-braze material; and an abrasive embedded in the self-braze material; and securing the combination to the substrate.

13 Claims, 4 Drawing Sheets

Related U.S. Application Data a continuation-in-part of application No. 14/750,415, filed on Jun. 25, 2015, now Pat. No. 10,018,056, and a continuation-in-part of application No. 14/750,324, filed on Jun. 25, 2015, now Pat. No. 10,012,095.

(60) Provisional application No. 62/020,041, filed on Jul. 2, 2014, provisional application No. 62/020,038, filed on Jul. 2, 2014, provisional application No. 62/020,036, filed on Jul. 2, 2014.

(51) Int. Cl.

| | | |
|---|---|---|
| *B23K 35/30* | (2006.01) | |
| *B23K 1/00* | (2006.01) | |
| *F01D 11/12* | (2006.01) | |
| *B23K 26/38* | (2014.01) | |
| *B24D 3/06* | (2006.01) | |
| *B24D 18/00* | (2006.01) | |
| *B23K 101/00* | (2006.01) | |
| *B23K 101/18* | (2006.01) | |
| *B23K 103/16* | (2006.01) | |

(52) U.S. Cl.
CPC .... *F05D 2230/237* (2013.01); *F05D 2230/90* (2013.01); *F05D 2300/175* (2013.01); *F05D 2300/2282* (2013.01); *F05D 2300/6032* (2013.01); *F05D 2300/611* (2013.01)

(56) References Cited

U.S. PATENT DOCUMENTS

| | | | |
|---|---|---|---|
| 4,018,576 A | 4/1977 | Lowder et al. | |
| 4,063,909 A * | 12/1977 | Mitchell | B22F 7/06 |
| | | | 51/309 |
| 4,228,214 A | 10/1980 | Steigelman et al. | |
| 4,719,080 A | 1/1988 | Duhl et al. | |
| 4,919,220 A * | 4/1990 | Fuller | E21B 10/567 |
| | | | 175/433 |
| 4,941,891 A * | 7/1990 | Tank | B23K 1/19 |
| | | | 51/293 |
| 5,161,335 A | 11/1992 | Tank | |
| 5,164,247 A | 11/1992 | Solanki et al. | |
| 5,264,011 A | 11/1993 | Brown et al. | |
| 5,359,770 A | 11/1994 | Brown et al. | |
| 5,551,840 A | 9/1996 | Benoit et al. | |
| 5,660,320 A | 8/1997 | Hoffmuller et al. | |
| 5,957,365 A | 9/1999 | Anthon | |
| 5,968,299 A | 10/1999 | Meier et al. | |
| 5,972,424 A | 10/1999 | Draghi et al. | |
| 6,103,186 A * | 8/2000 | Sievers | B22F 1/0003 |
| | | | 419/38 |
| 6,360,832 B1 * | 3/2002 | Overstreet | C23C 30/005 |
| | | | 175/374 |
| 6,530,971 B1 * | 3/2003 | Cohen | B23K 35/0244 |
| | | | 148/24 |
| 6,811,898 B2 | 11/2004 | Ohara et al. | |
| 6,887,036 B2 | 5/2005 | Ohara et al. | |
| 7,063,250 B2 | 6/2006 | Ohara et al. | |
| 8,075,662 B2 | 12/2011 | Minor et al. | |
| 8,354,176 B2 | 1/2013 | Minor et al. | |
| 8,616,847 B2 | 12/2013 | Allen | |
| 9,011,563 B2 * | 4/2015 | Sung | B24D 3/06 |
| | | | 51/293 |
| 9,199,357 B2 * | 12/2015 | Sung | B01J 3/062 |
| 9,221,154 B2 * | 12/2015 | Sung | B24D 18/0054 |
| 9,238,207 B2 * | 1/2016 | Sung | B01J 3/062 |
| 9,309,597 B2 * | 4/2016 | Gollerthan | B23K 35/0238 |
| 9,322,100 B2 * | 4/2016 | Manier | C23C 24/10 |
| 9,868,100 B2 * | 1/2018 | Sung | B01J 3/062 |
| 10,012,095 B2 * | 7/2018 | Stratton | B23K 35/0238 |
| 10,018,056 B2 * | 7/2018 | Stratton | C23C 28/022 |
| 10,030,527 B2 * | 7/2018 | Stratton | B23K 35/30 |
| 10,053,994 B2 * | 8/2018 | Stratton | B24D 3/06 |
| 10,392,938 B1 * | 8/2019 | Ghunakikar | C22C 30/00 |
| 2003/0084894 A1 | 5/2003 | Sung | |
| 2003/0132119 A1 | 7/2003 | Ohara et al. | |
| 2004/0091627 A1 | 5/2004 | Ohara et al. | |
| 2006/0078674 A1 | 4/2006 | Ohara | |
| 2008/0304975 A1 | 12/2008 | Clark et al. | |
| 2008/0317601 A1 | 12/2008 | Barril et al. | |
| 2010/0322780 A1 | 12/2010 | Manier | |
| 2011/0244770 A1 | 10/2011 | Boutaghou | |
| 2012/0051934 A1 | 3/2012 | Allen | |
| 2012/0099985 A1 * | 4/2012 | Strock | F01D 11/122 |
| | | | 415/230 |
| 2012/0189434 A1 * | 7/2012 | Strock | F01D 5/284 |
| | | | 415/173.4 |
| 2014/0044527 A1 * | 2/2014 | Parkos | F04D 29/023 |
| | | | 415/170.1 |
| 2014/0272464 A1 * | 9/2014 | Barnikel | B23K 35/32 |
| | | | 428/660 |
| 2014/0369741 A1 * | 12/2014 | Cui | B23K 1/0018 |
| | | | 403/271 |
| 2015/0111060 A1 * | 4/2015 | Kottilingam, Sr. | B22F 7/004 |
| | | | 428/608 |
| 2015/0132605 A1 | 5/2015 | Kumar et al. | |
| 2015/0174707 A1 * | 6/2015 | Li | B23P 6/045 |
| | | | 427/142 |
| 2015/0360311 A1 | 12/2015 | Zheng et al. | |
| 2015/0360328 A1 * | 12/2015 | Li | B23P 6/045 |
| | | | 228/119 |
| 2015/0375321 A1 * | 12/2015 | Cui | B22F 7/062 |
| | | | 428/408 |
| 2016/0032737 A1 * | 2/2016 | Strock | F01D 5/288 |
| | | | 415/1 |
| 2016/0122552 A1 * | 5/2016 | Strock | C09D 7/69 |
| | | | 60/805 |

FOREIGN PATENT DOCUMENTS

| | | |
|---|---|---|
| DE | 69732397 T2 | 1/2006 |
| EP | 1391537 A1 | 2/2004 |
| EP | 2113333 A2 | 11/2009 |
| EP | 2253738 A1 | 11/2010 |
| EP | 2374909 A1 | 10/2011 |
| EP | 2444524 A1 | 4/2012 |
| EP | 2444593 A1 | 4/2012 |
| GB | 2108534 A | 5/1983 |
| JP | 2005-337249 A | 12/2005 |
| WO | 95/17535 A1 | 6/1995 |
| WO | 2008/135803 A1 | 11/2008 |
| WO | 2011/000348 A1 | 1/2011 |
| WO | 2013/167334 A1 | 11/2013 |

OTHER PUBLICATIONS

European Office Action dated Mar. 27, 2018 for EP Patent Application No. 15175022.1.
U.S. Office Action dated Sep. 25, 2017 for U.S. Appl. No. 14/755,350.
European Search Report dated Dec. 22, 2015 for EP Patent Application No. 15175046.0.
European Search Report dated Dec. 21, 2015 for EP Patent Application No. 15175037.9.
U.S. Office Action dated Sep. 21, 2017 for U.S. Appl. No. 14/750,324.
U.S. Office Action dated Sep. 25, 2017 for U.S. Appl. No. 14/750,415.
Matthew J. Donachie et al, "Superalloys, A Technical Guide, Second Edition", Mar. 2002, p. 325 ASM International, Materials Park, Ohio.
Communication of a Notice of Opposition dated Jul. 24, 2020 for European Patent Application No. 15175022.1.
Material Product Data Sheet, Amdry 400 Braze Filler Metal, Aug. 9, 2014, Oerlikon Metco, Pfaffikon Switzerland.

\* cited by examiner

ABRASIVE PREFORMS AND MANUFACTURE AND USE METHODS

CROSS-REFERENCE TO RELATED APPLICATIONS

This is a continuation in part of U.S. patent application Ser. No. 14/755,350, filed Jun. 30, 2015, and entitled "Abrasive Preforms and Manufacture and Use Methods", published Jan. 7, 2016 as Publication No. 2016/0003066A1, which claims benefit of U.S. Patent Application No. 62/020,041, filed Jul. 2, 2014, and entitled "Abrasive Preforms and Manufacture and Use Methods", the disclosures of which applications and publication are incorporated by reference herein in their entireties as if set forth at length. This is a continuation in part of U.S. patent application Ser. No. 14/750,415, filed Jun. 25, 2015, and entitled "Abrasive Coating and Manufacture and Use Methods", published Jan. 7, 2016 as Publication No. 2016/0003065A1, which claims benefit of U.S. Patent Application No. 62/020,038, filed Jul. 2, 2014, and entitled "Abrasive Coating and Manufacture and Use Methods", the disclosures of which applications and publication are incorporated by reference herein in their entireties as if set forth at length. This is a continuation in part of U.S. patent application Ser. No. 14/750,324, filed Jun. 25, 2015, and entitled "Abrasive Coating and Manufacture and Use Methods", published Jan. 7, 2016 as Publication No. 2016/0003064A1, which claims benefit of U.S. Patent Application No. 62/020,036, filed Jul. 2, 2014, and entitled "Abrasive Coating and Manufacture and Use Methods", the disclosures of which applications and publication are incorporated by reference herein in their entireties as if set forth at length.

BACKGROUND

The disclosure relates to abrasive coatings. More particularly, the disclosure relates to pre-formed abrasive coatings which may be applied to a substrate.

Gas turbine engines may have one or more nested spools of compressor sections and turbine sections co-rotating about an engine axis. An exemplary two-spool engine has: a low speed/pressure spool comprising a low speed/pressure compressor (LPC) and a low speed/pressure turbine (LPT); and a high speed/pressure spool comprising a high speed/pressure compressor (HPC) and a high speed/pressure turbine (HPT). The core flowpath of the engine passes air sequentially through the LPC and HPC to the combustor where it mixes with fuel and combusts. Combustion gases then proceed further downstream along the core flowpath through the HPT and LPT. Thus, the turbine sections may drive the rotation of their respective associated compressor sections. Optionally, one or more fan sections may be driven by the LPT or another turbine section. The fan sections drive air along a bypass flowpath, bypassing the core to produce additional thrust.

The individual compressor and turbine sections may be centrifugal or axial in configuration. In exemplary axial configurations, each section may have a number of stages. Each stage comprises an annular array or row (stage) of rotor blades. The blade stage may have an associated adjacent stage of stator vane airfoils. The airfoils are shaped to turn, accelerate and compress the working fluid flow in the compressor, and to generate lift for conversion to rotational energy in the turbine.

In a number of locations it may be desired to minimize clearance between relatively rotating components. A main example is the clearance between blade tips and the adjacent inner diameter (ID) surface of non-rotating structure. This ID surface is often formed by the ID surfaces of a circumferential array of blade outer air seal (BOAS) segments. The ID surface may be formed by an abradable ceramic coating on the ID surface of a metallic substrate of the BOAS segments. To interface with the abradable coating, the blade tips may bear an abrasive. The abrasive functions to abrade the abradable coating and provide a wear-in to a low radial clearance value between blade and BOAS. Low clearance means low blow-by of gas between tip and BOAS and thus high efficiency.

Many methods have been proposed for applying abrasive to blade tips. These include direct plating and direct spraying methods. Additionally, use of pre-formed abrasive has been proposed. U.S. Pat. No. 7,063,250 of Ohara et al., issued Jun. 20, 2006, discloses forming a squealer tip preform by plating an MCrAlY matrix and cubic boron nitride (CBN) abrasive to a brazing filler sheet. The preform is then brazed to the tip of a main airfoil substrate. U.S. Pat. No. 8,616,847 of Allen, issued Dec. 31, 2013, discloses forming a squealer tip preform by plating an MCrAlY matrix and cubic boron nitride (CBN) abrasive to a squealer tip preform. The preform is then brazed to the tip of a main airfoil substrate.

SUMMARY

One aspect of the disclosure involves a method for applying an abrasive. The method comprises: applying, to a substrate, the integral combination of a self-braze material and an abrasive embedded in the self-braze material; and securing the combination to the substrate.

A further embodiment of any of the foregoing embodiments may additionally and/or alternatively include the securing comprising heating to cause the self-braze material to braze to the substrate or an intervening component.

A further embodiment of any of the foregoing embodiments may additionally and/or alternatively include the applying comprising applying an assembly of the combination and at least one additional braze material layer, said additional braze material layer lacking abrasive.

A further embodiment of any of the foregoing embodiments may additionally and/or alternatively include the assembly further comprising a cast intermediate layer.

A further embodiment of any of the foregoing embodiments may additionally and/or alternatively include the self-braze material and the at least one additional braze material layer each comprising a mixture of alloys of different melting points.

A further embodiment of any of the foregoing embodiments may additionally and/or alternatively include the securing comprises heating and leaves at least a portion of the self-braze material with a composition comprising, in weight percent: cobalt 2.5-13.5; chromium 12-27; aluminum 5-7; yttrium 0.0-1.0; hafnium 0.0-1.0; silicon 1.0-3.0; tantalum 0.0-4.5; tungsten 0.0-6.5; rhenium 0.0-2.0; molybdenum 0.1-1.0; and the balance nickel.

A further embodiment of any of the foregoing embodiments may additionally and/or alternatively include said portion of the self-braze material having said composition comprising, in weight percent: cobalt 2.5-13.5; chromium 12-27; aluminum 5-7; yttrium 0.0-1.0; hafnium 0.0-1.0; silicon 1.0-3.0; tantalum 2.0-4.5; tungsten 2.0-6.5; rhenium 0.0-2.0; molybdenum 0.1-1.0; and the balance nickel.

A further embodiment of any of the foregoing embodiments may additionally and/or alternatively include said composition having no more than 1.0 weight percent of any other individual element.

A further embodiment of any of the foregoing embodiments may additionally and/or alternatively include said composition having no more than 3.0 weight percent of all other individual elements combined.

A further embodiment of any of the foregoing embodiments may additionally and/or alternatively include the abrasive comprising cubic boron nitride.

A further embodiment of any of the foregoing embodiments may additionally and/or alternatively include a weight ratio of the abrasive to the self-braze material being from 1:2 to 2:1.

A further embodiment of any of the foregoing embodiments may additionally and/or alternatively include a weight ratio of the abrasive to the self-braze material being from 1:2 to 2:1.

A further embodiment of any of the foregoing embodiments may additionally and/or alternatively include the self-braze material comprising a sintered mixture of: at least one first alloy of low melting point relative to the substrate; and at least one second alloy of high melting point relative to the first alloy.

A further embodiment of any of the foregoing embodiments may additionally and/or alternatively include the combination comprising said abrasive in a matrix of: at least one first alloy of low melting point relative to the substrate; and at least one second alloy of high melting point relative to the first alloy.

A further embodiment of any of the foregoing embodiments may additionally and/or alternatively include: the at least one first alloy comprising about 21.25-22.75 chromium, about 5.7-6.3 aluminum, about 11.5-12.5 cobalt, about 5.7-6.3 silicon, boron in an amount no greater than 1.0 weight percent, and a balance of nickel plus impurities if any; and the at least one second alloy comprising about 4.75-10.5 chromium, about 5.5-6.7 aluminum, up to about 13 weight percent cobalt, about 3.75-9.0 tantalum, about 1.3-2.25 molybdenum, about 3.0-6.8 tungsten, about 2.6-3.25 rhenium, up to about 0.02 boron, about 0.05-2.0 hafnium, up to about 0.14 carbon, up to about 0.35 zirconium, and a balance of nickel plus impurities if any.

A further embodiment of any of the foregoing embodiments may additionally and/or alternatively include a boron content of the first alloy being at least 0.30 weight percent greater than a boron content, if any, of the second alloy.

A further embodiment of any of the foregoing embodiments may additionally and/or alternatively include: the at least one first alloy comprising no more than 1.0 weight percent of any other individual element; and the at least one second alloy comprising no more than 1.0 weight percent of any other individual element.

A further embodiment of any of the foregoing embodiments may additionally and/or alternatively include the combination having a characteristic thickness $T_2$ of 0.20-2.50 millimeters.

A further embodiment of any of the foregoing embodiments may additionally and/or alternatively include the applied combination consisting of the self-braze material and the abrasive.

A further embodiment of any of the foregoing embodiments may additionally and/or alternatively include forming the combination by: mixing the abrasive and powders of at least two different alloys; and sintering the mixture.

A further embodiment of any of the foregoing embodiments may additionally and/or alternatively include the at least two different alloys comprising: at least one first alloy of low melting point relative to the substrate; and at least one second alloy of high melting point relative to the first alloy.

A further embodiment of any of the foregoing embodiments may additionally and/or alternatively include an article formed by the method.

A further embodiment of any of the foregoing embodiments may additionally and/or alternatively include the article being a turbine blade and wherein the combination is applied to a tip surface of an airfoil of the blade.

Another aspect of the disclosure involves an article comprising: a metallic substrate; and a layer secured to the substrate and at comprising a matrix material least partially embedding an abrasive. At least a portion of the matrix material has a composition comprising, in weight percent: cobalt 2.5-13.5; chromium 12-27; aluminum 5-7; yttrium 0.0-1.0; hafnium 0.0-1.0; silicon 1.0-3.0; tantalum 0.0-4.5; tungsten 0.0-6.5; rhenium 0.0-2.0; molybdenum 0.1-1.0; and the balance nickel plus impurities, if any.

A further embodiment of any of the foregoing embodiments may additionally and/or alternatively include the article being a turbine blade and the material being along a tip surface of an airfoil of the blade.

A further embodiment of any of the foregoing embodiments may additionally and/or alternatively include the layer being directly bonded to the substrate.

A further embodiment of any of the foregoing embodiments may additionally and/or alternatively include a cast layer intervening between the layer and the substrate.

Another aspect of the disclosure involves a braze preform comprising the integral combination of: a self-braze material; and an abrasive embedded in the self-braze material.

A further embodiment of any of the foregoing embodiments may additionally and/or alternatively include the self-braze material comprising a sintered mixture of: at least one first alloy; and at least one second alloy of high melting point relative to the first alloy.

A further embodiment of any of the foregoing embodiments may additionally and/or alternatively include an additional braze material layer without abrasive.

A further embodiment of any of the foregoing embodiments may additionally and/or alternatively include a Ni-based superalloy layer between the additional braze material layer and the combination.

A further embodiment of any of the foregoing embodiments may additionally and/or alternatively include the Ni-based superalloy layer being a cast layer.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
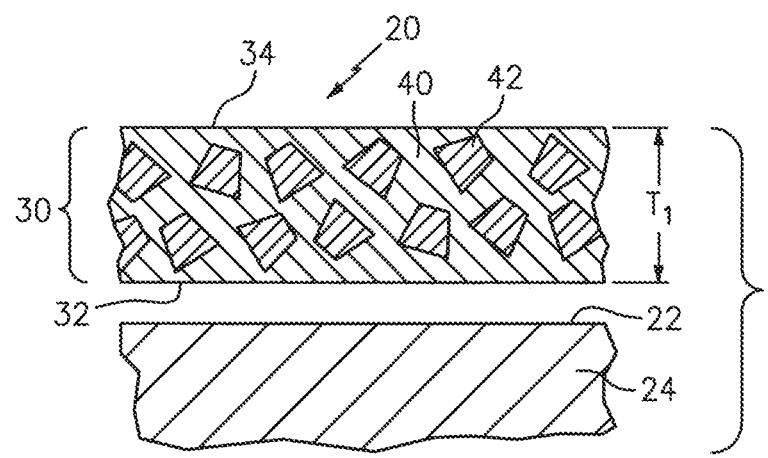
FIG. 1 is a schematic cross-section of an abrasive preform exploded away from a substrate to which it is being applied.

FIG. 1 shows an abrasive preform 20. The preform may have a planform (footprint) cut to correspond to the area of a surface 22 substrate 24 to which it is to be applied. Exemplary substrate surfaces are tip surfaces of airfoils of turbine blades for installation in gas turbine engines.

The preform has a layer 30 having an inboard surface or face 32 and an outboard surface or face 34. The layer comprises abrasive particles 42 at least partially embedded in a matrix 40.

The layer thickness is shown as an essentially constant $T_1$. Measured thickness may be a mean, median, or modal value. Exemplary $T_1$ is 0.25 mm, more broadly 0.20-2.5 mm or 0.20-1.0 mm. Such thickness $T_1$ may be chosen so as to bond to the substrate and provide environmental protection. Thicker values may serve for dimensional restoration (e.g., when tip substrate is worn).

The exemplary turbine blade substrate is a nickel-based superalloy, more particularly, having a single crystal (SX) structure.

Figure 4:
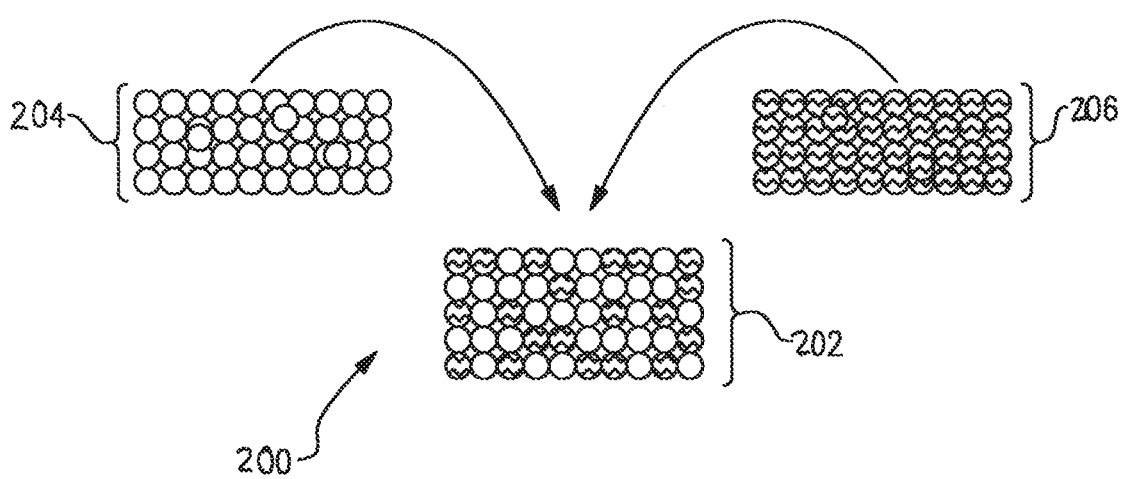
FIG. 4 illustrates an example of self-braze alloy composition comprising a blend of a low melting point alloy and a high melting point alloy.

The matrix 40 comprises an oxidation-resistant braze material. It is capable of self-brazing to the substrate. For self-brazing, it comprises a mixture of alloys of at least two different compositions. At least one of the alloys is a relatively low melting point (low melt) alloy and at least one of the alloys is a relatively high melting point (high melt) alloy. These alloys may themselves be nickel-based superalloys. The low melt alloy may comprise a relatively higher content of one or more elements acting as melting point suppressants/depressants than does the high melt alloy. U.S. Pat. No. 8,075,662 (the '662 patent) of Minor et al., issued Dec. 13, 2011, the disclosure of which patent is incorporated by reference herein in its entirety as if set forth at length, discloses exemplary braze material formed of a mixture of powders of differing composition. FIG. 4 shows the self-braze alloy composition 200 including a blend 202 of a high melt alloy 204 and a low melt alloy 206. The high melt alloy 204 and the low melt alloy 206 are schematically shown as powders.

From the '662 patent, an exemplary high melting point alloy comprises, in weight percent, about 4.75-10.5 chromium, about 5.5-6.7 aluminum, up to about 13 weight percent cobalt, about 3.75-9.0 tantalum, about 1.3-2.25 molybdenum, about 3.0-6.8 tungsten, about 2.6-3.25 rhenium, up to about 0.02 boron, about 0.05-2.0 hafnium, up to about 0.14 carbon, up to about 0.35 zirconium, and a balance of nickel. Other elements may be present in impurity amounts (e.g., typically not more than 1.0 weight percent each and 3.0 weight percent aggregate). The term "about" as used in this description relative to compositions or other values refers to possible variation in the given value, such as normally accepted variations or tolerances in the art.

Similarly, an exemplary corresponding low melting point alloy comprises about 21.25-22.75 chromium, about 5.7-6.3 aluminum, about 11.5-12.5 cobalt, about 5.7-6.3 silicon, boron in an amount no greater than 1.0 weight percent, and a balance of nickel. Other elements may be present in impurity amounts (e.g., typically not more than 1.0 weight percent each and 3.0 weight percent aggregate). In further examples said boron may be present in 0.040-1.0 or 0.45-0.55 weight percent. Said boron may be at least 0.40 weight percent greater than a boron content of the high melting point alloy. An exemplary melting point of the high melt alloy is 2300° F. to 2500° F. (1260° C. to 1371° C.). An exemplary melting point of the low melt alloy is 2050° F. to 2200° F. (1121° C. to 1204° C.). An exemplary difference in alloy melting points is at least 50° C. or an exemplary 50° C. to 150° C. or 60° C. to 120° C.

Table I below provides two examples of powder combinations. The identified final alloys reflect the nominal averaging of the compositions based upon their weight percentages. As a practical matter, especially near the interfaces with the substrate and the matrix, inter-diffusion may cause departures from this theoretical value. The final actual composition is, however, effective to provide desired oxidation resistance.

TABLE I

Exemplary Oxidation-Resistant Braze alloys

| | % | Ni | Cr | Al | Co | Ta | Mo | W | Re | Si | B | Hf | Y |
|---|---|---|---|---|---|---|---|---|---|---|---|---|---|
| High Melt #1 | 75 | 57 | 25 | 6 | | 4 | | 8 | | | | 1 | 0.1 |
| Lo Melt #1 | 25 | 53.5 | 22 | 6 | 12 | | | | | 6 | 0.5 | | |
| Final Alloy #1 | | 56.1 | 24.3 | 6.0 | 3.0 | 3.0 | 0.0 | 6.0 | 0.0 | 1.5 | 0.1 | 0.8 | 0.1 |
| High Melt #2 | 55 | 63.3 | 7 | 6.2 | 7.5 | 6.5 | 1.5 | 5 | 3 | | | 0.15 | |
| Lo Melt #2 | 45 | 53.5 | 22 | 6 | 12 | | | | | 6 | 0.5 | | |
| Final Alloy #2 | | 58.9 | 13.8 | 6.1 | 9.5 | 3.6 | 0.8 | 2.8 | 1.7 | 2.7 | 0.2 | 0.1 | |

Exemplary high melt to low melt weight ratios are between 50:50 and 85:15, more particularly, 55:45 to 80:20.

The oxidation resistance comes from optimized percentages of Cr, Al, Si, Hf, and Y and effectively prevents oxidation at temperatures up to at least 2150° F. (1177° C.) in engine operating conditions. Similar compositions to the resulting final alloys are found in U.S. Pat. No. 8,354,176 (the '176 patent) of Minor et al., issued Jan. 15, 2013, the disclosure of which patent is incorporated by reference herein in its entirety as if set forth at length. The '176 patent discloses an exemplary composition comprising, in weight percent, cobalt about 2.5-13.5, chromium about 12-27, aluminum about 5-7, yttrium about 0.0-1.0, hafnium about 0.0-1.0, silicon about 1.0-3.0, tantalum about 0.0-4.5, tungsten about 0.0-6.5, rhenium about 0.0-2.0, molybdenum about 0.1-1.0 and the balance nickel.

A more particular example is an exemplary composition comprising, in weight percent, cobalt 2.5-13.5, chromium 12-27, aluminum 5-7, yttrium 0.0-1.0, hafnium 0.0-1.0, silicon 1.0-3.0, tantalum 2.0-4.5, tungsten 2.0-6.5, rhenium 0.0-2.0, molybdenum 0.1-1.0 and the balance nickel.

Other elements may be present in impurity amounts (e.g., typically not more than 1.0 weight percent each and 3.0 weight percent aggregate). For example, among these will likely be residual boron from the low melt alloy and elements diffused in from the matrix, abrasive, or substrate. Some of such diffused elements may be localized to transition regions, leaving a core region/layer closer to the nominal composition formed by the two alloys.

Such material may have improved oxidation/corrosion resistance compared with a baseline standard second generation nickel-based superalloy (e.g., an alloy such as PWA1484 of United Technologies Corporation, Hartford Conn. and disclosed as the preferred example of U.S. Pat. No. 4,719,080 (the '080 patent) of Duhl et al., issued Jan. 12, 1988, and entitled "Advanced high strength single crystal superalloy compositions", the disclosure of which patent is incorporated by reference herein in its entirety as if set forth at length). Similarly, such baseline superalloy may have superior oxidation and corrosion resistance to conventional braze materials. Accordingly, comparison to such a baseline may be used to distinguish relative oxidation and corrosion resistance.

In the '176 patent, an uncoated PWA 1484 substrate was used as the baseline and assigned a relative absolute life of exactly 1. It and inventive coating compositions were subject to oxidation and corrosion resistance tests.

In the '176 patent, a burner rig oxidation test was performed. In these tests, a coating was placed on a bar or coupon and mounted in a holder, in this case, a rotating spindle. The spindle rotated and was thrust into a flame for a period of time and withdrawn for a much shorter period of time, and after a number of these repetitive cycles, the oxidation was measured. The flame is a combustion product comprised of an ignited mixture of jet fuel and air. The speed of rotation of the spindle can vary from less than 400 rpm to more than 600 rpm. The samples were held in the flame for about 1 to 60 minutes, followed by removal for 1 to 5 minutes. Results were reported as a relative life, or as a ratio of life measured of the specimen over the life measured of a control. All tests were run at 2150° F. (1177° F.), although temperatures between 1800° F. (980° C.) and 2300° F. (1260° C.) can be used. The intent of this type of evaluation is to replicate the environment experienced in actual engines without having to perform the test using an actual engine.

In the '176 patent, coating identified as Composition One had a composition in weight percent of 3.0 cobalt, 24.3 chromium, 6.0 aluminum, 0.1 yttrium, 0.8 hafnium, 1.5 weight percent silicon, 3.0 tantalum, 6.0 tungsten, 0.0 rhenium, 0.0 molybdenum and the balance nickel. Substrates coated with Composition One had a relative absolute oxidation life value using the same test of approximately 2.2. In other words Composition One has a functioning oxidation life that was more than twice as long a functioning life as the base line uncoated substrate.

A coating identified as Composition Two had a composition in weight percent of 12.0 cobalt, 13.6 chromium, 6.1 aluminum, 0.0 yttrium, 0.8 hafnium, 2.7 silicon, 3.5 tantalum, 2.8 tungsten, 1.5 rhenium, 0.8 molybdenum and the balance nickel. Substrates coated with composition Two had a relative oxidation life value of approximately 1.4, or almost half again as long a functioning life compared to the baseline alloy substrate against which it is compared.

Accordingly, by this test, the two tested compositions had oxidation lives exceeding that of the baseline, more particularly, at least 1.3 times the baseline. Depending on conditions, preferred coatings may have such oxidation lives of at least 1.5 times the baseline or up to 2.5 times the baseline if not more.

In the '176 patent, an additional method of assessing the oxidation life of a coating system is via cyclic furnace oxidation testing. This Furnace Cycle Oxidation Weight Change Measurement test was conducted, comparing the same uncoated Ni based superalloy substrate with a substrate coated with Composition One as set forth above. In this test, specimens of each were raised and lowered into an air furnace, with the furnace maintained at the same temperature for all of the tests. No jet fuel was used. After a certain number of cycles, the specimens were removed, and weighed and the data recorded. Cycling the same specimens was resumed.

The uncoated Ni based superalloy substrate lost considerable weight after a relatively few cycles. Specifically, the uncoated superalloy substrates lost 65 mg/cm$^2$ in 100 cycles. Substrates coated with Composition One only lost 8 mg/cm$^2$ in over 360 cycles. This is a significant improvement in oxidation resistance showing that the addition of the coating increases the oxidation durability of the components, thus, allowing parts to be in service for substantially longer periods of time. Thus, by this test, material loss may be reduced by an exemplary at least 50%, more particularly, at least 75% relative to the baseline.

In the '176 patent, a corrosion test was performed. The test comprised taking a selected number of samples, exposing them to a salt solution, placing them in the elevated temperature in a static air furnace, without jet fuel or other combustion materials, for a period of time, such as a full day. Other time periods of less than twelve hours to more than thirty six hours can be used. The samples are removed, more salt solution is applied, and the samples were reinserted in the environment. At selected periods of time, one of the samples were removed from the test apparatus and the effects of corrosion were evaluated.

Substrates coated with Composition Two identified above were compared to the standard uncoated second generation Ni based superalloy. Four coupons of each were subjected to this test. One of the four coupons was removed and evaluated at each of the times shown in Table II. Samples were metallographically prepared, and the depth of attack through the coating was measured.

Presented below in Table II are the results of this test which was run at 1650° F. (899° C.)

TABLE II

Hot Corrosion Test

| | Depth of attack (mils (micrometers)) | |
|---|---|---|
| Time (hours) | Uncoated Ni-based superalloy | Substrate with Composition Two Coating |
| 25 | 0.9 (23) | 0.5 (13) |
| 100 | 2.3 (58) | 0.5 (13) |
| 500 | 5.6 (142) | 2.0 (51) |
| 1000 | 9.8 (249) | 2.7 (69) |

As can be seen in Table II, the resistance of the coupons coated with Composition Two to hot corrosion was much greater, and was almost as effective at 1000 hours as the uncoated superalloy at 100 hours. Thus, exemplary improvement may be characterized as having a greater time to achieve the same level of corrosion than the baseline does at 100 hours, more particularly, at least 50% more time or at least doubling or tripling or quadrupling.

The exemplary abrasive is a cubic boron nitride (CBN). Exemplary CBN is particles of characteristic size 3.5 to 9 mils (0.09 to 0.23 mm). The exemplary abrasive by weight quantity is between 2:1 and 1:2 relative to matrix.

In a process of manufacture, sheets (plates) of the abrasive braze material are prepared by mixing the abrasive particles and the two alloy powders in desired weight ratio. The mixture is the mixture is then pre-sintered into an essentially fully dense plate. Exemplary sintering is by heating the mixture in a vacuum atmosphere at elevated temperature (e.g., 2100° F. to 2300° F. (1149° C. to 1260° C.)) for exemplary times of 1-10 hours. The sintering does not fully homogenize the alloy but may cause inter-diffusion at boundaries between particles of the two alloys. For example, it may create a near homogeneous alloy with discrete low melting areas. This is effective to leave particles of the low melt alloy with sufficient quantity of the melting point suppressant to bond the prealloyed mixture to the substrate at a later stage in the processing.

Preforms may then be cut (e.g., laser cut or water jet cut) from the sheet. In the blade tip example, these may have airfoil-shaped footprints/planforms (or planforms formed as perimeter portions of airfoil shapes for tips having squealer pockets).

The preforms may then be brazed to the substrates. Exemplary brazing comprises applying the preforms with surfaces 32 supported atop substrate surface 22. The preforms may initially be temporarily/partially secured by one or more appropriate means. For example, a tack weld at one location along the perimeter may be effective. Alternatively, an adhesive may be used. Such adhesive may evaporate or melt away in subsequent heat. The exemplary brazing occurs without the use of any additional flux or chemical treatment. The substrates may then be heated (e.g., in a furnace) to a temperature effective to braze the preform to the substrate. Exemplary heating is accomplished in a vacuum furnace or by induction heating. Exemplary heating is at 2100° F. to 2300° F. (1149° C. to 1260° C.) for a period of at least one minute, more particularly, an exemplary 5-10 minutes. A short time above the solidus of the pre-alloyed plate will allow high temperature diffusion braze bonding of environmental resistant braze matrix. This may allow a sufficient quantity of the melting point suppressant to bond and diffuse the prealloyed mixture to the substrate.

Figure 2:
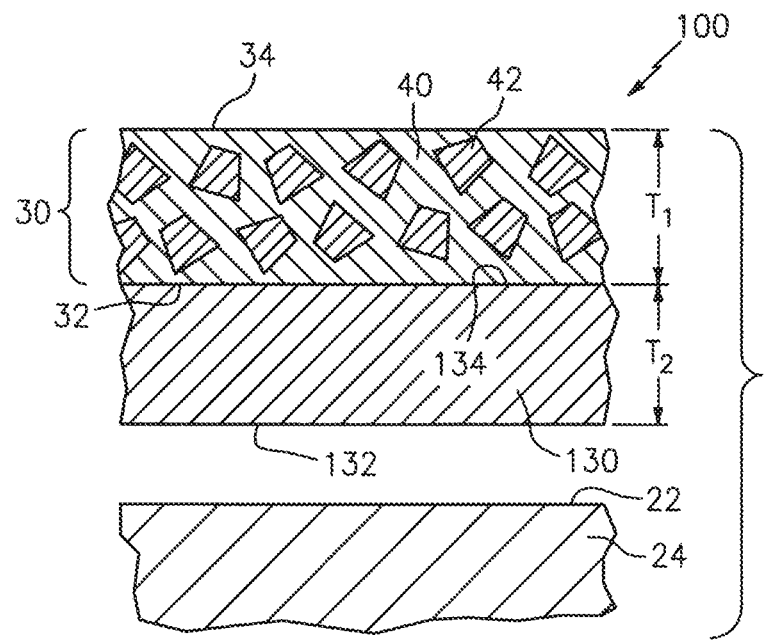
FIG. 2 is a schematic cross-section of a second abrasive preform exploded away from a substrate to which it is being applied.
Figure 3:
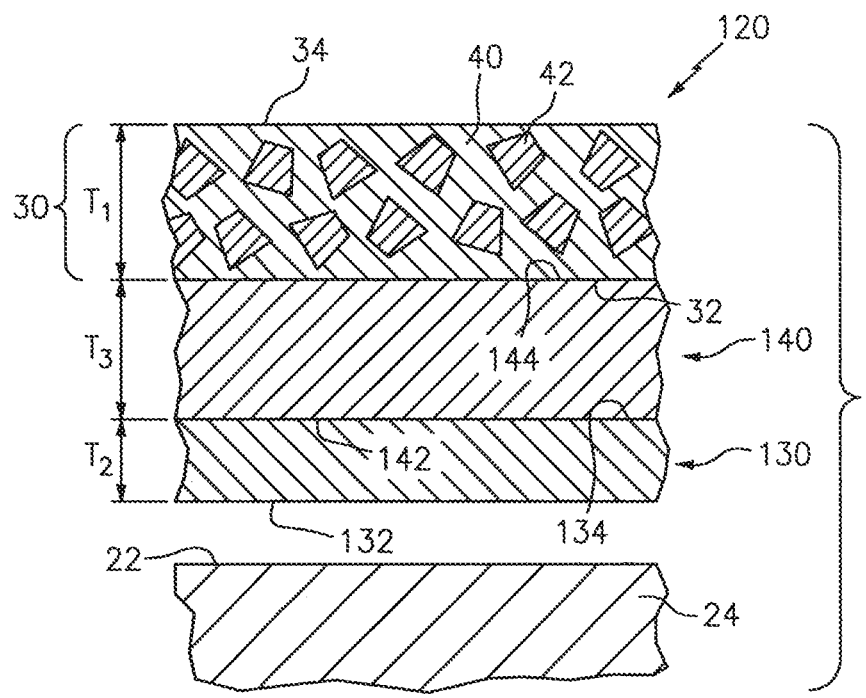
FIG. 3 is a schematic cross-section of a third abrasive preform exploded away from a substrate to which it is being applied.

FIGS. 2 and 3 show alternate preforms 100 and 120 wherein the layer 30 described above is an outer layer of a multi-layer preform.

In FIG. 2, the layer 30 is atop a base layer 130 having an inboard surface or face 132 and an outboard surface or face 134. The base layer comprises a self-braze mixture as discussed above for the matrix 40 but lacking embedded abrasive.

The base layer thickness is shown as an essentially constant $T_2$. Exemplary $T_2$ is 0.25 mm, more broadly 0.20-2.5 mm or 0.20-1.0 mm. Such thickness $T_2$ may be chosen so as to bond to the substrate and provide environmental protection. Thicker values may serve for dimensional restoration (e.g., when tip substrate is worn). In this embodiment, $T_1$ may be similar to or less than the exemplary FIG. 1 ranges. For example, Exemplary FIG. 2 $T_1$ is 0.25 mm, more broadly 0.20-2.5 mm or 0.20-1.0 mm. Such thickness $T_1$ may be chosen merely to provide the desired depth of abrasive based upon planned wear rates and tolerances.

The two layers may be separately manufactured as discussed above and then attached to each other. In one example, the sheets are attached to each other. This may be done by tack welding followed by a further sintering step effective to secure the two layers while still leaving the base layer with sufficient low melt alloy to braze to the substrate. Brazing to the substrate may be as is with the FIG. 1 preform. Alternatively, the airfoil planforms may be cut from the two layers before the layers are secured to each other.

In FIG. 3, an intermediate layer 140 intervenes between the layer 30 and the base layer 130 and has an inboard surface or face 142 and an outboard surface or face 144.

The intermediate layer adds thickness. This added thickness may be desired in a dimensional restoration situation wherein original/prior substrate material has been removed. The intermediate layer may be a non-braze material. As discussed further below, the intermediate layer may be formed of a nickel-base superalloy.

Exemplary alloys are as disclosed in U.S. Pat. No. 4,719,080 of Duhl et al., issued Jan. 12, 1988, and entitled "Advanced High Strength Single Crystal Superalloy Compositions" and U.S. Pat. No. 6,007,645 of Cetel et al., issued Dec. 28, 1999, and entitled "Advanced High Strength, Highly Oxidation Resistant Single Crystal Superalloy Compositions Having Low Chromium Content", the disclosures of which patents are incorporated by reference herein as if set forth at length. Such alloy may be selected for high oxidation resistance and high strength.

The intermediate layer thickness is shown as an essentially constant $T_3$. Exemplary $T_3$ is 1.5 mm, more broadly 0.5-2.5 mm or 1.0-2.0 mm. Such thickness $T_3$ may be chosen so as to provide dimensional restoration in addition to strength and oxidation resistance.

In this FIG. 3 embodiment, exemplary $T_1$ may be similar to that of the FIG. 2 embodiment. Exemplary $T_2$ may be similar to or less than the exemplary FIG. 2 ranges. For example, the intermediate layer may provide the desired dimensional restoration and oxidation resistance and the base layer may merely be thick enough to perform the braze function and provide a small amount of accommodation of surface irregularities. Exemplary FIG. 3 $T_2$ is 0.25 mm, more broadly 0.10-0.50 mm or 0.15-0.40 mm. Such thickness $T_2$ may be chosen so as to be sufficient to bind the abrasive in the matrix. Thicker matrix may allow multiple layers of abrasive particles to improve life of abrasive.

In a process of manufacture, sheets (plates) of the intermediate layer material are prepared by casting. For example, they may be investment cast as single crystal sheets. Assembly with the other layers may be as described above. securing the preform to the substrate may be as described above.

Several alternative embodiments involve pre-forming the airfoil or other footprint/planform shape of the intermediate layer material. In one example an elongate single crystal cylinder is cast a cross-section corresponding to the desired footprint/planform. The cylinder is then sliced (e.g., water jet cut) to form a plurality of intermediate layer pieces. These may be assembled with braze material (e.g., also cut to the desired footprint/planform) as in the aforementioned embodiment.

Yet other embodiments using the intermediate layer may dispose of or alter the base layer. For example, the base layer could be replaces with a conventional braze foil used to secure a two layer preform having layer 30 atop layer 140 to the substrate.

Figure 5:
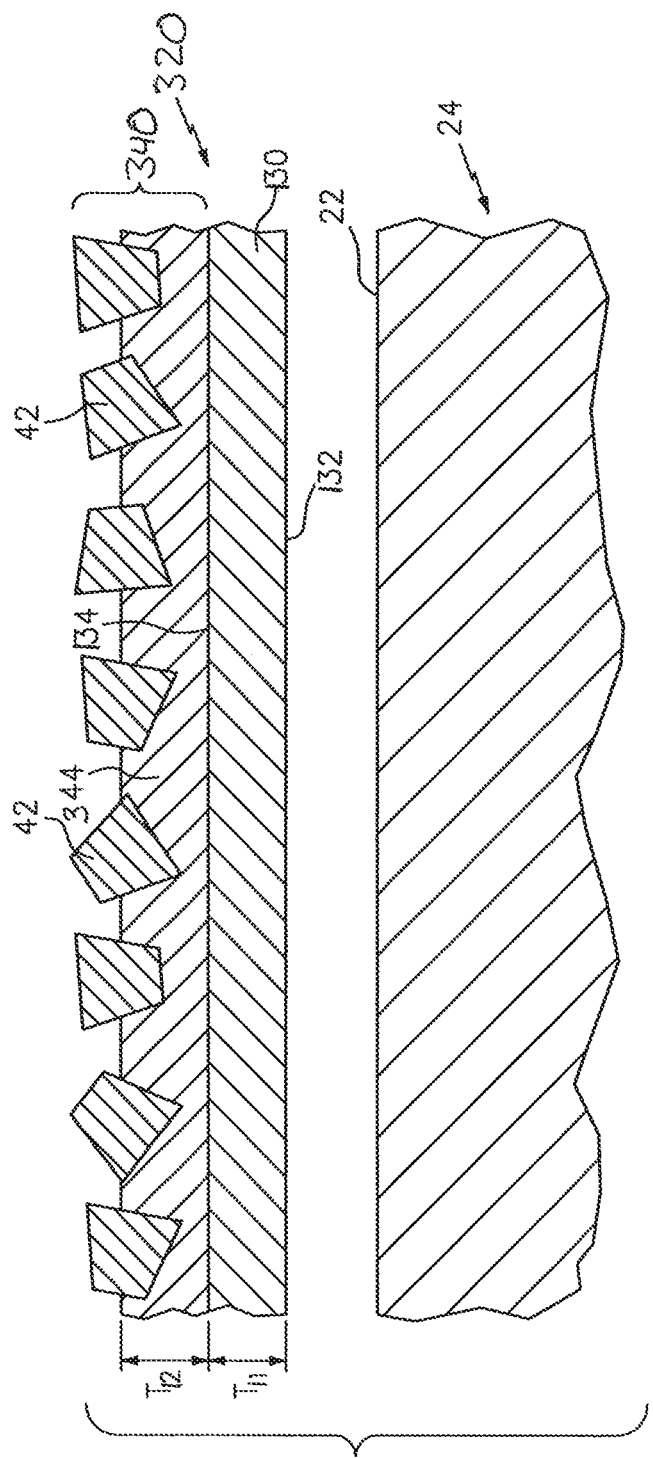
FIG. 5 is a schematic cross-section of a fourth abrasive preform exploded away from a substrate to which it is being applied.
Figure 6:
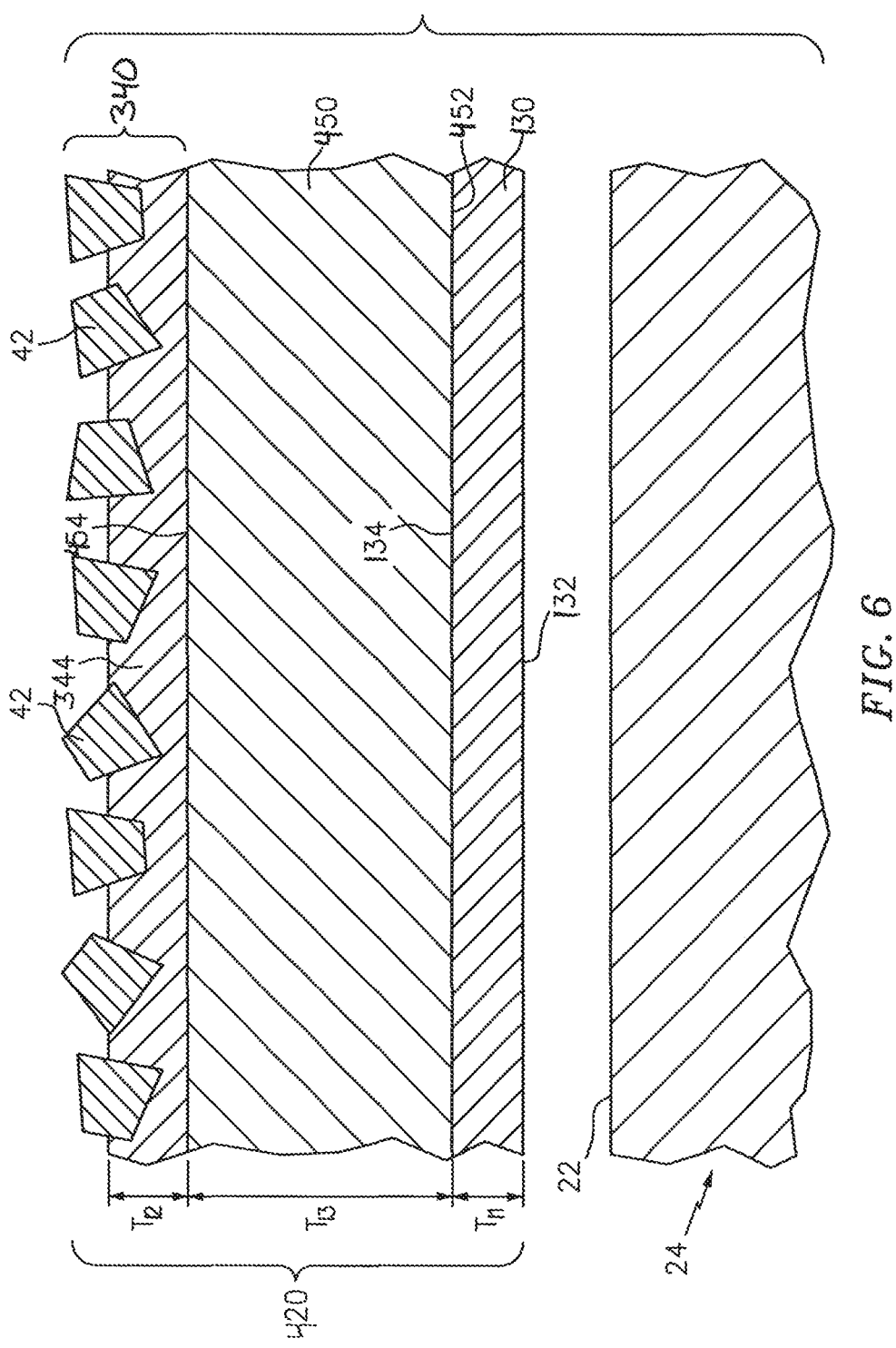
FIG. 6 is a schematic cross-section of a fifth abrasive preform exploded away from a substrate to which it is being applied.

FIG. 5 shows a preform 320 according to U.S. application Ser. No. 14/750,324 and FIG. 6 shows a preform 420 according to U.S. application Ser. No. 14/750,415 cited above. The preform has a base layer 130 (with composition as discussed relative to matrix 40 but lacking the embedded abrasive) having an inboard surface or face 132 and an outboard surface or face 134. As is discussed further below, the base layer is formed by a braze material. An abrasive layer 340 has abrasive particles 42 at least partially embedded in a matrix 344.

In the preform 420, an intermediate layer 450 (e.g., such as described for intermediate layer 140) has an inboard surface or face 452 and an outboard surface or face 454 and is between the base layer 130 and abrasive layer 340. The intermediate layer adds thickness. This added thickness may be desired in a dimensional restoration situation wherein original/prior substrate material has been removed.

The base layer thickness is shown as an essentially constant $T_{11}$. Measured thickness may be a mean, median, or modal value. The abrasive layer matrix thickness is shown as an essentially constant $T_{12}$ (e.g., allowing for variation adjacent abrasive particles). The intermediate layer thickness is shown as an essentially constant $T_{13}$.

Exemplary $T_{11}$ is 0.25 mm, more broadly 0.20-2.5 mm or 0.20-1.0 mm. Such thickness $T_{11}$ may be chosen so as to bond to the substrate and provide environmental protection. Thicker values may serve for dimensional restoration (e.g., when tip substrate is worn). Exemplary $T_{12}$ is 0.25 mm, more broadly 0.10-0.50 mm or 0.15-0.40 mm. Such thickness $T_{12}$ may be chosen so as to be sufficient to bind the abrasive in the matrix. Thicker matrix may allow multiple layers of abrasive particles to improve life of abrasive. Exemplary $T_{13}$ is 1.5 mm, more broadly 0.5-2.5 mm or 1.0-2.0 mm. Such thickness $T_{13}$ may be chosen so as to provide dimensional restoration.

The matrix 344 comprises an MCrAlY. Matrix material is chosen so to provide oxidation resistance and corrosion resistance. An exemplary MCrAlY is Ni/Co plating with Cr, Al, and Y. More particularly, an exemplary MCrAlY comprises, by weight 50-70% Ni and/or Co. The CrAlY may be an exemplary 30-50%. Impurity or other levels of components are possible. Of the Cr, Al, and Y, an exemplary proportion is 64-75% Cr, 24-35% Al, and 1-3% Y. An exemplary narrower range is 67-73% Cr, 27-33% Al, and 1-2% Y.

The exemplary abrasive 42 is a cubic boron nitride (CBN). Exemplary CBN is particles of characteristic size 3.5 to 9 mils (0.09 to 0.23 mm). The exemplary abrasive quantity is 20-40% volume percent relative to combined abrasive and matrix 344.

In a process of manufacture, sheets (plates) of the intermediate layer 450 (for the FIG. 6 embodiment) material are prepared by casting. For example, they may be investment cast as single crystal sheets.

For both the FIG. 5 and FIG. 6 embodiments, sheets (plates) of the braze material are prepared by mixing the powders in desired weight ratio and pre-sintering them into an essentially fully dense plate. Exemplary sintering is by heating a mixture in a vacuum atmosphere at elevated temperature (e.g., 2100° F. to 2300° F. (1149° C. to 1260° C.)) for exemplary times of 1-10 hours. The sintering does not fully homogenize the alloy but may cause inter-diffusion at boundaries between particles. For example, it may create a near homogeneous alloy with discrete low melting areas. This is effective to leave particles of the low melt alloy with sufficient quantity of the melting point suppressant to bond the prealloyed mixture to the substrate at a later stage in the processing.

The matrix and abrasive may be co-applied to the outboard surface (134 for FIG. 5 or 454 for FIG. 6). Exemplary co-application is a plating process. Exemplary plating is a slurry plating in which discrete states of abrasive, CrAlY, and nickel and/or cobalt (hereafter collectively Ni/Co) are applied. This is followed by an interdiffusion discussed below. In one exemplary process, the plating is an entrapment plating process wherein the Ni/Co is used in one or more stages to entrap particles of the other components. In one example, a first stage involves Ni/Co entrapment plating of a first amount of the CrAlY powder to the substrate. The second stage involves Ni/Co entrapment plating of the abrasive (e.g., CBN) atop the first plating. A third stage involves Ni/Co entrapment plating of a second amount of CrAlY powder around the abrasive particles applied in the second stage. The relatively large size of abrasive particles compared with the CrAlY particles means that there will be a high degree of protrusion of the abrasive particles applied during the second stage compared with CrAlY particles applied during the first stage.

After plating, there may be a heat treatment to cause the diffusion to at least partially homogenize the MCrAlY and bond it to the braze material. Alternatively, this result may be achieved during the final bonding. For the GFIG. 6 embodiment, the heat treatment may also be used to bond the intermediate layer to the base layer. For example, the base layer may be secure or otherwise held to the intermediate layer by adhesive or tack welding.

The exemplary heat treatment is to 1900° F. to 2000° F. (1038° C. to 1204° C.). If performed, this heat treatment leaves the material of the base layer 130 still having discrete low and high melt phases in order to allow a sufficient quantity of the melting point suppressant to bond the pre-alloyed mixture to the substrate at a later stage in the processing.

Preforms 320 or 420 may then be cut (e.g., laser cut or water jet cut) from the sheet. In the blade tip example, these may have airfoil-shaped planforms (or planforms formed as perimeter portions of airfoil shapes for tips having squealer pockets).

The preforms 320 or 420 may then be brazed to the substrates. Exemplary brazing comprises applying the preforms with surfaces 32 supported atop substrate surface 22. The preforms may initially be temporarily/partially secured by one or more appropriate means. For example, a tack weld at one location along the perimeter may be effective. Alternatively, an adhesive may be used. Such adhesive may evaporate or melt away in subsequent heat. The exemplary brazing occurs without the use of any additional braze alloy, flux, or chemical treatment. The substrates may then be heated (e.g., in a furnace) to a temperature effective to braze the preform to the substrate. Exemplary heating is accomplished in a vacuum furnace or by induction heating. Exemplary heating is at 2100° F. to 2300° F. (1149° C. to 1260° C.) for a period of at least one minute, more particularly, an exemplary 5-10 minutes. A short time above the solidus of the pre-alloyed plate 130 will allow high temperature diffusion braze bonding of environmental resistant braze while not affecting the plated CBN/MCrAlY matrix or the single crystal layer 450. This allows more preferred/durable chemistries to be for the braze material. This may allow a sufficient quantity of the melting point suppressant to bond and diffuse the prealloyed mixture to the substrate without affecting the structure of the plated CBN in MCrAlY matrix.

Several alternative embodiments relative to the FIG. 6 embodiment involve pre-forming the airfoil or other footprint/planform shape of the intermediate layer material. In one example an elongate single crystal cylinder is cast having a cross-section corresponding to the desired footprint/planform. The cylinder is then sliced (e.g., water jet cut) to form a plurality of intermediate layer pieces. These may be assembled with braze material (e.g., also cut to the desired footprint/planform) as in the aforementioned embodiment. The matrix and abrasive may be applied as above either before or after the bonding.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing corresponding SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. An abrasive braze preform comprising:
   a self-braze layer; and
   a matrix at least partially embedding an abrasive, wherein:
   the self-braze layer comprises a sintered sheet of:
      at least one first alloy; and
      at least one second alloy of high melting point relative to the first alloy;
   the at least one first alloy comprises about 21.25-22.75 chromium, about 5.7-6.3 aluminum, about 11.5-12.5 cobalt, about 5.7-6.3 silicon, boron in an amount no greater than 1.0 weight percent, and a balance of nickel plus impurities if any; and
   the at least one second alloy comprises about 4.75-10.5 chromium, about 5.5-6.7 aluminum, up to about 13 weight percent cobalt, about 3.75-9.0 tantalum, about 1.3-2.25 molybdenum, about 3.0-6.8 tungsten, about 2.6-3.25 rhenium, up to about 0.02 boron, about 0.05-2.0 hafnium, up to about 0.14 carbon, up to about 0.35 zirconium, and a balance of nickel plus impurities if any.

2. The preform of claim 1 further comprising:
   an intermediate layer between the matrix and the self-braze layer.

3. The preform of claim 2 wherein:
   the intermediate layer is a pre-cast layer.

4. The preform of claim 2 wherein:
   the intermediate layer is diffusion brazed to the self-braze layer.

5. The preform of claim 1 wherein:
   the matrix is an MCrAlY.

6. The preform of claim 5 wherein:
   the matrix is a plating.

7. The preform of claim 5 further comprising:
   a cast single crystal intermediate layer between the matrix and the self-braze layer.

8. The braze preform of claim 7 wherein the self-braze layer comprises a sintered mixture of:
   at least one first alloy; and
   at least one second alloy of high melting point relative to the first alloy.

9. The braze preform of claim 5 wherein the self-braze layer comprises a sintered mixture of:
   at least one first alloy; and
   at least one second alloy of high melting point relative to the first alloy.

10. The preform of claim 9 further comprising:
    the matrix is a plating.

11. An abrasive braze preform comprising:
    a self-braze layer; and
    a matrix at least partially embedding an abrasive, wherein:
    the matrix is an MCrAlY; and
    the preform further comprises a cast single crystal intermediate layer between the matrix and the self-braze layer.

12. The preform of claim 11 wherein:
    the matrix is a plating.

13. The braze preform of claim 11 wherein the self-braze layer comprises a sintered mixture of:
    at least one first alloy; and
    at least one second alloy of high melting point relative to the first alloy.

* * * * *